Sept. 8, 1959            W. BAER            2,902,966

TUGBOAT AND TOWING SYSTEM COMPRISING THE SAME

Filed Sept. 9, 1957            7 Sheets-Sheet 1

INVENTOR.
WOLFGANG BAER
BY Toulmin & Toulmin

Attorneys

Sept. 8, 1959                    W. BAER                    2,902,966
TUGBOAT AND TOWING SYSTEM COMPRISING THE SAME
Filed Sept. 9, 1957                                    7 Sheets-Sheet 2

INVENTOR.
WOLFGANG BAER
BY Toulmin & Toulmin

Attorneys

Sept. 8, 1959 W. BAER 2,902,966
TUGBOAT AND TOWING SYSTEM COMPRISING THE SAME
Filed Sept. 9, 1957 7 Sheets-Sheet 4

INVENTOR.
WOLFGANG BAER
BY Toulmin & Toulmin

Attorneys

Sept. 8, 1959          W. BAER          2,902,966

TUGBOAT AND TOWING SYSTEM COMPRISING THE SAME

Filed Sept. 9, 1957          7 Sheets-Sheet 7

INVENTOR.
WOLFGANG BAER
BY Toulmin & Toulmin

Attorneys

United States Patent Office 2,902,966
Patented Sept. 8, 1959

2,902,966

TUGBOAT AND TOWING SYSTEM COMPRISING THE SAME

Wolfgang Baer, Heidenheim (Brenz), Germany, assignor to J. M. Voith G.m.b.H., Heidenheim (Brenz), Germany Application September 9, 1957, Serial No. 682,952

Claims priority, application Germany December 13, 1950

10 Claims. (Cl. 114—235)

This invention relates to a new construction for tugboats and the method for using the same.

This application is a continuation-in-part of my co-pending patent applications, Serial No. 260,281, filed December 6, 1951, Serial No. 395,240, filed November 30, 1953, and Serial No. 577,599, filed April 11, 1956, all of which are now abandoned.

It is an object of my invention to provide a tugboat which is safe in operation under those conditions which are dangerous to the conventional tugboats.

It is another object of the invention to provide a system for towing a vessel by means of a long, flexible connection to a tugboat according to the invention.

It is yet another object of the invention to provide a tugboat which, in towing a vessel in the aforesaid towing system, has a greater stability on its course, and better propulsion efficiency, and causes a lower bow wave than known tugboats.

It is a further object of my invention to provide a tugboat which, in towing a vessel in the aforesaid towing system, can carry out all maneuvers independent of the conditions of wind and wave, free from the dangers incurred by conventional tugboats.

It is another object of this invention to provide a construction of a tugboat in such a manner that the tugboat proper need only be made of a minimum size required to house therein and carry with sufficient buoyancy the operating elements of the boat such as the engine or engines therefor, while avoiding any lack of stability of the boat due to the minimum size thereof.

Another particular object of the present invention is the provision of a tugboat especially adapted for use in extremely narrow channels, with the boat being particularly characterized by an extremely high degree of stability relative to the small size thereof.

Still another particular object of this invention is the provision of a tugboat construction which can be made particularly narrow for operation in narrow channels, as opposed to the usual type boat construction, but in connection with which the narrow construction of the tugboat is not accompanied by any intolerable degree of instability.

The aforesaid objects will be attained, and the drawbacks of constructions and systems of the prior art, to be discussed in detail hereafter, can be avoided by the tugboat and towing system comprising the tugboat, according to my invention, which tugboat and system is illustrated in the following drawings, on the basis of which the description of my invention will proceed. In these drawings:

Figure 15 is a lateral view, and

Figure 25a is a perspective illustration of the position e shown in the maneuver illustrated in Figure 24a;

Figure 25aa is a force diagram of the maneuver illustrated in Figure 25a;

Figure 25bb is a force diagram of the maneuver illustrated in Fig. 25b;

Figure 1:
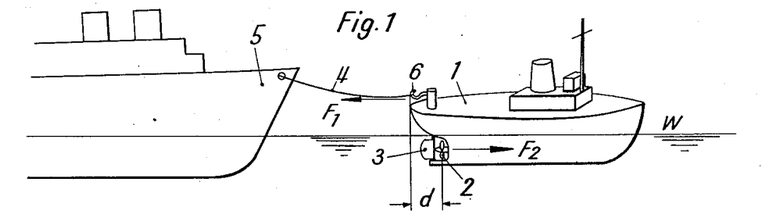
Figure 1 shows schematically a known system of a conventional stern-propelled and stern-steered tugboat, a towed vessel, and a flexible, elongated connecting line such as cable or the like attached to the stern of the tugboat.

Conventional tugboats are used in a number of ways, a frequent one of which is illustrated in the system shown in Figure 1. The tugboat 1 is shown propelled by a screw propeller 2 and steered by a rudder 3. One or several long, flexible cables, hawsers or tow lines 4, connect the towed vessel 5 to fastening means, for instance, a towhook 6 mounted at the stern of the vessel.

The use of blade wheel or cycloidal propellers as the propelling means for ships and boats is also well known, and has been used as the driving means for tugboats. However, this propeller is normally positioned at the stern of the craft, in the place of screw propeller 2, but this arrangement is subject to mechanical forces comprising the pull exercised by the towline 4 as indicated by arrow $F_1$ and the forwardly impelling force $F_2$ of the propelling means 2. Since the point of attack of force $F_1$ is forward or aft of the attack of force $F_2$ at 2 by a very short distance $d$, this arrangement has the drawback of causing difficulties in maneuvering.

Also, with tugboats, the short length of the hull requires that the beam section of the latter immediately ahead of the propeller be relatively bulky, and this leads to a relatively high suction loss thrust deduction and, when the boat moves at higher speeds, it causes an undesirably high bow wave. Nevertheless, in spite of these well-known drawbacks, no changes in order to improve this known driving arrangement were adopted in the past, chiefly because locating the drive at another position was expected to lead to a very poor degree of efficiency.

Furthermore, the dimensions of a tugboat as known in the prior art are always determined not only by the weight of the engine and the auxiliaries to be carried in the hull of the tugboat and the space required therefor, but they are also decisively influenced by the demand of sufficient stability of course and stability against capsizing. In order to make a conventional tugboat of the kind having a rear propeller sufficiently responsive to the conventional rudder means, the cable of the tow must be fastened on the tugboat approximately half way between the bow and the stern of the latter.

Figure 2:
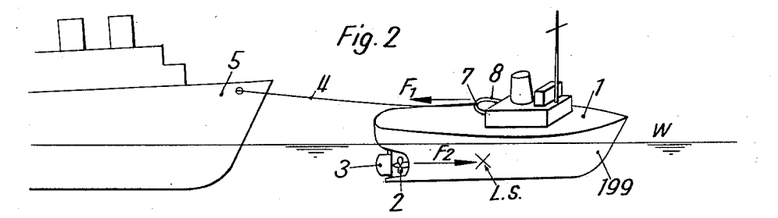
Figure 2 illustrates a similar known system in which the connecting line is attached amidship the tugboat.

Therefore, a towing system preferred in the art is that illustrated in Figure 2, in which the connecting towlines or lines 4 are fastened amidship at a laterally displaceable fastening means 7 guided in an arc-shaped rail means 8.

Since the tugboat is pushed forward by the forces $F_2$ of the stern screw 2, the tugboat operates under a labile equilibrium, i.e., any deviation from the straight course makes force $F_1$ of the tow pull the tugboat further off course. These deviations have to be counteracted by the rudder 3, and the whole travel of the tugboat becomes oscillatory. In order to reduce these pendulum movements of the boat to a reasonable measure, it is necessary to damp them. The required damping is effected by the "lateral plan," which is the product of the length and draught of the boat. The greater the output of pull of the tugboat, the larger must be the "lateral plan," for the pressure of water indicated by arrows $F_3$ (Figures 25aa and 25bb) against the same resists the aforesaid pendulum movements and helps the tugboat to maintain its course. The desired output of the tugboat also determines the third dimension, namely, the width of the same.

The tugboat must be safe against capsizing under a lateral pull of the tow, and its hull must therefore be of sufficient width. The desired output of a tugboat thus determines the minimum length, width and draught of its hull within narrow limits, which are larger than those required if the tugboat were only designed to carry the weight of its engine and auxiliaries. A reduction in the weight of the engine does not substantially lower these limits, if the same output of pull is to be achieved.

In realizing the several objectives of this invention, a tugboat is constructed having a propelling and steering means at the bow end and having a towing hook mounted in the rear portion of the craft, preferably in the rear third of the boat.

Figure 23:
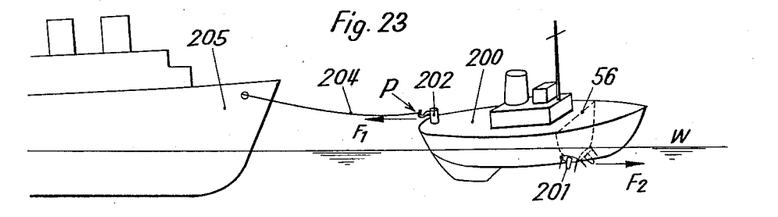
Figure 23 illustrates the preferred system according to my invention in which the connecting line is attached to hook means on the stern third of the bow-driven tugboat according to my invention.

The resulting towing system comprising a tugboat of this kind is illustrated in Figure 23 to be discussed hereinafter.

In constructing a craft according to the present invention, either regular screw propellers or cycloidal propellers can be employed, in which latter case, if only one cycloidal propeller is used, there may be a torque on the boat tending to rotate it about a vertical axis, which torque can be compensated by displacing the towing hook laterally from the longitudinal center line of the ship, the towing hook in all cases being placed in the rear third of the boat.

Referring now to Figures 3 to 6 somewhat more in detail, and with like numerals being employed in the several views for corresponding parts, the hull of the tugboat is designated 10, and the prime mover which supplies motive power for driving the propelling means is indicated at 12. In each case the propelling means is located at the bow end of the boat, with the tow hook 17 being located in every instance in the rear end of the boat, particularly in the rear third thereof and on the boat deck 11.

Figure 3:
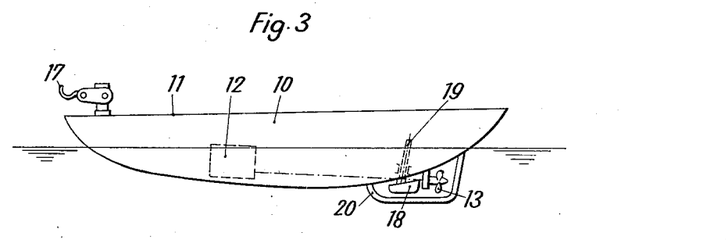
Figure 3 shows more or less diagrammatically a tugboat constructed according to this invention utilizing an ordinary screw propeller having rigid or adjustable blades and having a towhook provided in the rear third of the boat deck.

In Figure 3 reference numeral 18 designates a rudder mounted on and rotatably hinged about a substantially vertical axle 19, and 20 indicates a protective cage surrounding both the rudder and the screw propeller 13, whereby these parts are protected against damage from striking the bottom of a channel or obstructions which may be in a channel.

Figure 4:
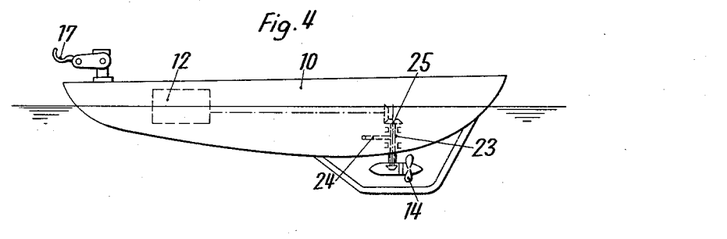
Figure 4 shows a construction similar to Figure 3, but wherein the screw is rotatable bodily about a vertical axis for steering purposes.

In Figure 4 the screw 14 is supported on a housing that is carried on the bottom of a shaft 23 extending upwardly into the hull of the boat and adapted for being rotated by a lever 24, or a similar device, for changing the direction of propulsion of the boat. The driving shaft 25 for the screw runs through shaft 23 and is connected by suitable gearing with the output shaft of prime mover 12 and also with the driving shaft on which screw 14 is mounted.

Figure 5:
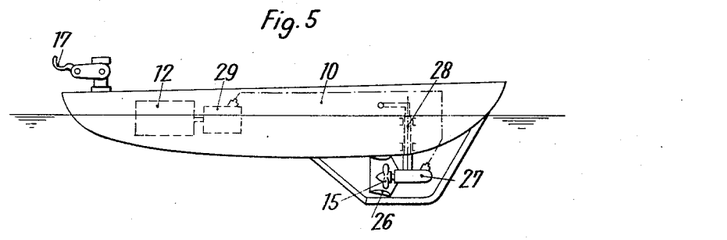
Figure 5 shows a still further modified construction similar to Figure 4 in that the screw is rotatable about a vertical axis for steering purposes, but wherein there is also a housing surrounding the screw and the drive motor for the screw is mounted directly on the screw support.

In Figure 5 there is shown an arrangement wherein the screw 15 is provided with a generally venturi-shaped housing 26, and which housing is rigid with another housing 27 that rotatably carries the screw 15 for rotation about vertical axis 28. Housing 27 is adapted for containing an electric motor which is connected for being energized by a generator 29 that is driven by prime mover 12.

Figure 6:
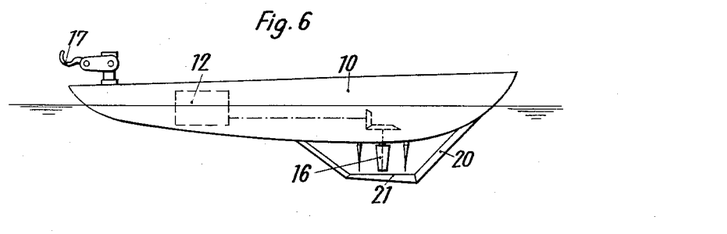
Figure 6 shows yet another construction similar to that of Figures 3–5 wherein a high speed cycloidal propeller is employed.

In Figure 6 the propulsive means takes the form of a cycloidal propeller which may be of the type disclosed in United States Patent 1,870,674 or in United States Patent 1,681,500. The propeller 16 is enclosed in a protective cage 20, similarly to the screws 13, 14 and 15 in Figures 3, 4 and 5, except that in the embodiment of Figure 6 the cage 20 may include a plate beneath propeller 16 located at 21 and which takes the form of an airfoil, this arrangement serving to increase the propulsive thrust of the propeller. A perspective view of this arrangement of the cage 20 and air foil plate 21 is to be found in Figure 22.

In each of the modifications illustrated, the propeller is arranged at the lower end of the bow, which is inclined upwardly and forwardly whereby the acceleration field of the water current to the propulsive means is formed in the water directly in front of the bow below the water line, thus decreasing the resistance which the ship encounters and eliminating the aforementioned high bow waves which lead to inefficient operation of the boat. This is especially true with the arrangement of Figure 6 wherein the propeller forms a jet which takes the form of a tangent to the ship's bottom over a relatively wide area.

The combination of features of the present invention permits the hull of the boat to be developed in a most advantageous manner, and it is not necessary for the tugboat to be extremely wide in order to provide for good stability thereof.

Figure 7:
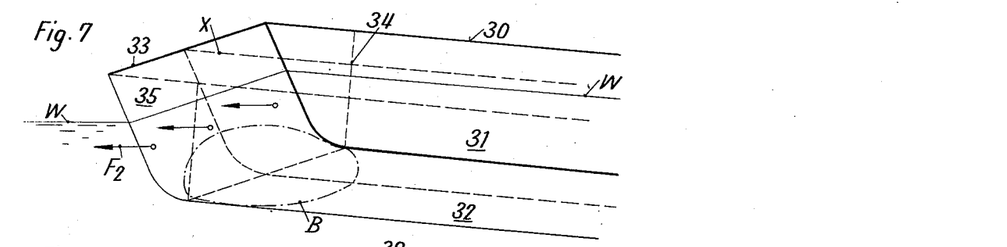
Figure 7 shows one type of sloping of the bow portion of a tugboat having the construction shown in Figure 6.
Figure 8:
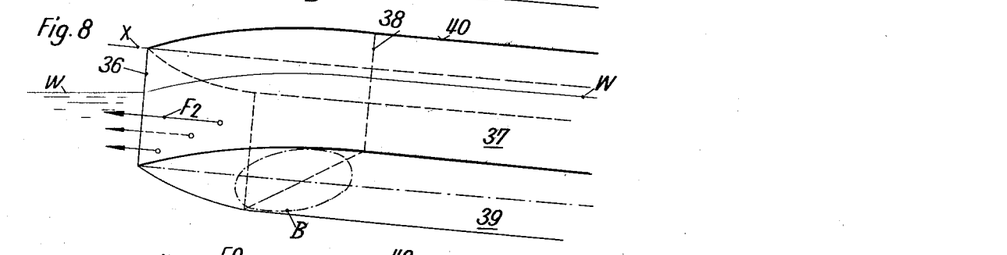
Figure 8 shows a different type of sloping of the bow portion of a tugboat constructed as illustrated in Figure 6.
Figure 9:
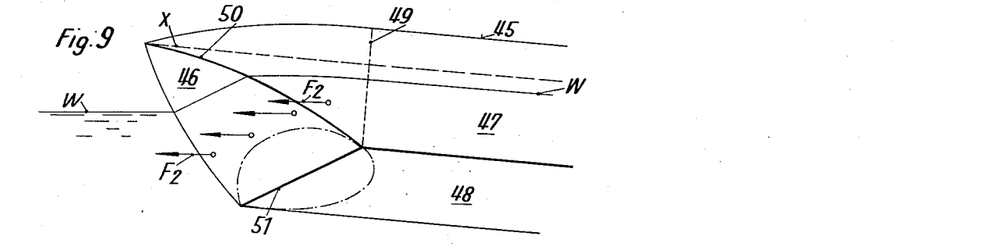
Figure 9 illustrates yet a third type of sloping suitable for tugboats constructed as illustrated in Figure 6.

Figures 7–9 are intended to illustrate more clearly what I mean by the terms "upwardly and outwardly sloped," as well as "formerly inwardly sloped" and "forwardly upwardly sloped," and serve to explain the functioning of the bow drive, in particular if a cycloidal propeller or cycloidal propellers are used therefor.

Figure 7 shows the bow portion of a tugboat hull 30, having the central longitudinal axis, vertical lateral walls 31, and a substantially flat bottom 32. The bow part of the deck ends in a rectangular bow 33 above the water line W. From approximately the beam section 23, the bow portion of the hull is "upwardly forwardly" sloped. The bow drive, for instance, a cycloidal propeller, must then be located substantially in the area delineated by the dashed-dotted line B, especially immediately behind the beam section 34. It will be noted that the sloped portion 35 of the bow is planar.

In Figure 8, the ship's bow portion is "forwardly inwardly sloped" toward a substantially vertical bowline 36, the vertical walls 37 merging beginning from a beam section 38 in forward direction. Again the hull 40 is provided with a planar bottom 39, and the bow drive is preferably located in or immediately behind the region enclosed by the dashed-dotted line B adjacent or directly at the beam section 38.

In Figure 9 the bow portion of the tugboat 45 is both "forwardly upwardly sloped" as in Figure 7, and "forwardly inwardly sloped" as in Figure 8, there resulting a flat, and, for instance, a planar upwardly forwardly sloped bow portion 46 below the water line W. The walls 47 are again vertical, and the hull bottom 48 flat. The bow drive is again preferably located in the area delineated by the dashed and dotted line B, i.e., in the vicinity of—especially near behind—the beam section 49, at which the forward as well as inward sloping of the bow portion begins.

Figures 19, 20:
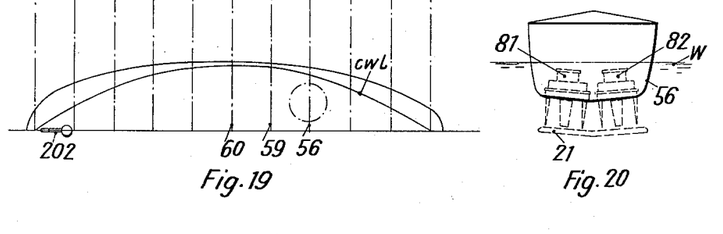
Figure 19 is a bottom view thereof.
Figure 20 is a front view thereof.
Figure 21:
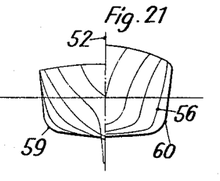
Figure 21 is a front view showing the beam sections as in Figure 19.
Figure 22:
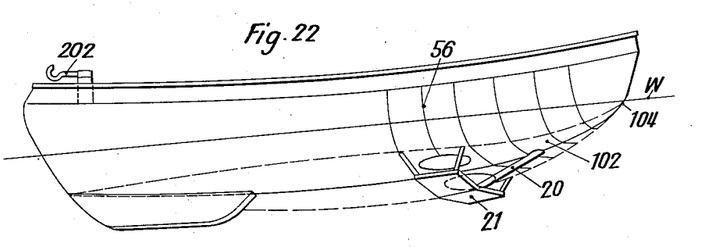
Figure 22 is a perspective view looking toward the bottom of the bow portion of a tugboat illustrated in Figures 18–21.

As is also shown in Figures 20–22, the side walls of the tugboat need not be vertical but can be "upwardly outwardly sloped," as for instance shown best by the beam section 56 in Figure 20.

In brief, the tugboat according to my invention comprises as a main feature the positioning beneath the forward part of the hull of a vessel, one or several propellers, preferably high speed cycloidal propellers, for instance Voith-Schneider propellers, serving concurrently as propulsion and steering means.

Another important feature consists in mounting the simultaneously propelling and steering drive means in the arrangement according to the invention, in the bottom of the vessel fore part at or immediately adjacent that beam section of the vessel forward of which the cross sectional areas of the beam sections of the vessel and, consequently, at least in most cases, the depth of the vessel under water decreases rapidly. This is the case forward of beam sections 34, 38 and 49 in Figures 7, 8 and 9, respectively.

In order to obtain a satisfactory propulsion and steering of the tugboats, according to my invention, it is important that a sufficiently large part of the bow portion of the tugboat below the water line forward of the propelling means forms at least one planar or curved hull oblique in forward direction to form an angle with the central longitudinal axis X of the tugboat.

The oblique surface area of the bow portion may be one upwardly forwardly sloped surface as surface 35 in Figure 7, or two inwardly forwardly curved surfaces as in Figure 8, or an upwardly forwardly inclined surface 46 and two inwardly forwardly curved surfaces as in Figure 9, or a gradually forwardly upwardly and inwardly sloped underwater bow portion as portion 102 in Figures 18 to 22 to be explained hereinafter. The oblique surface or surfaces of this bow portion must extend from the propeller at least toward the general region where the bow emerges from the waterline. The water surrounding the submerged bow portion is then suctioned toward the propeller means, thereby creating a field of partial vocuum in front of the propeller means. The forwardly upwardly and/or inwardly sloped bow portion in front of the propeller must, therefore, be of sufficient length below the water line to offer to the field of partial vacuum a sufficiently large surface of attack. For it is the forwardly directed force component thus created which causes the vessel to move forward against the direction of suction, i.e., the flow of water into the propeller is drawn downwardly away from the water in front of the vessel.

Figure 10:
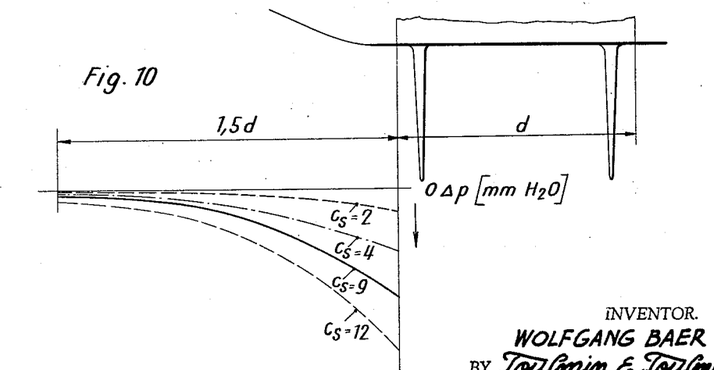
Figure 10 is a graph showing the effective extension of the field of partial vacuum, or suction field, in front of a cycloidal propeller used as a bow drive for a tugboat in accordance with my invention.
Figure 11:
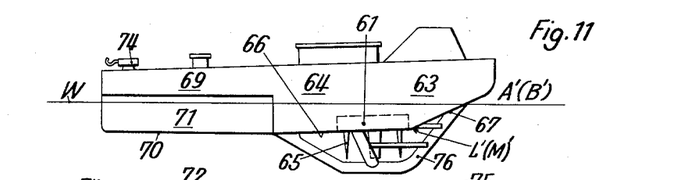
Figure 11 shows a lateral view of a tugboat constructed according to the present invention and having one cycloidal propeller as a bow drive and hook means for towing a vessel at the stern of the boat deck.
Figure 12:
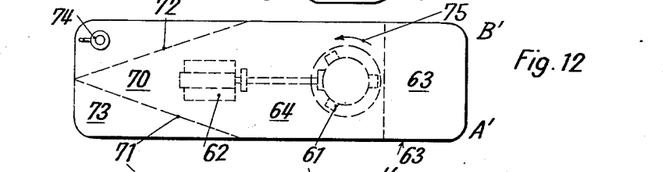
Figure 12 is a top view of the tugboat illustrated in Figure 11.
Figure 13:
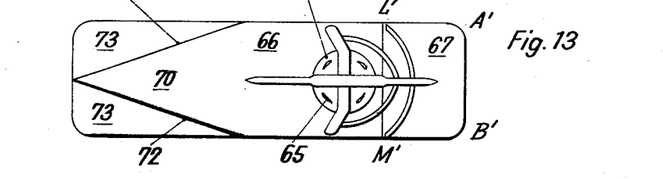
Figure 13 is a bottom view of the tugboat illustrated in Figure 11.
Figure 14:
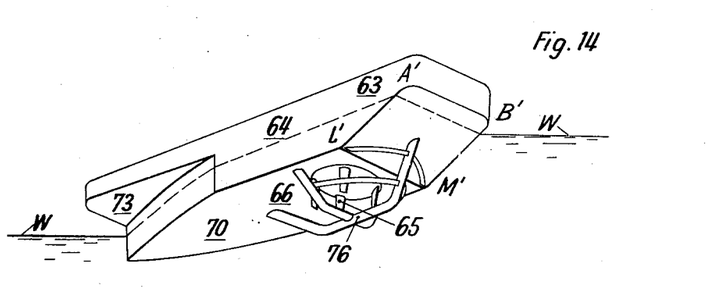
Figure 14 is a perspective view of the same tugboat as illustrated in Figures 12 and 13, looking toward the bottom of the boat.

As is shown in Figure 10, the field of partial vacuum in front of a cycloidal propeller varies with the load index $c_s$ and with the extension of the suction field in forward direction from the propellers.

$$\text{Load index (load coefficient)} \, c_s = \frac{S}{F \cdot Ve^2 \cdot \gamma/2 \, g}$$

$S$ = propeller thrust in kg;
$F$ = blade length · orbit diameter in m.$^2$;
$Ve$ = entrance velocity in m./s.;
$\gamma$ = specific weight of water;
$g$ = acceleration due to gravity.

The load index is great when the boat moves at slow speeds and the load is heavy, as it will be in the case of a tugboat. The load index is small if the boat moves rapidly and carries only a light load. Now, the graph of Figure 10 shows that the partial vacuum immediately in front of the propellers is high in particular if the load index is great, but it also shows that the partial vacuum quickly decreases with growing distances from the propeller. For a cycloidal propeller having a diameter $d$ the field has an effective extension of approximately $d/2$ to $1.5 \, d$ and preferably $d$. Therefore, a propeller having a diameter $d$ is mounted most effectively at that region of the bottom of the fore part of a vessel where the upwardly or upwardly and inwardly sloped portion of the underwater bow portion of the vessel will permit the field of partial vacuum of $d/2$ to $1.5 \, d$ to attack that sloped bow portion. The region where the propeller should be mounted most effectively is therefore adjacent the above-mentioned beam section in Figures 7–9. The diameter of the propeller and the extension of the sloped bow portion in front of the propeller should be proportionate to each other according to the relationship shown in Figure 10, if the optimal effect is to be obtained.

Owning to the particularity of the cycloidal propeller, the rectangular propeller jet of which lies with a broad surface corresponding to the diameter of the propeller along the bottom of the ship, with this kind of propeller the coaction between propeller jet and ship's bottom is considerably more intensive than with screw propellers.

From this it follows that a construction according to this invention comprising a flat ship's bottom preferably free from any protrusions obstructing the aforesaid jet, in combination with a bow drive utilizing cycloidal propeller means, is associated with a stronger influencing of the ship's efficiency factors than would be possible by the use of a screw propeller.

According to another specific feature of this invention illustrated in Figures 11–17, the stern of the hull may be of a wedge formation having a substantially flat bottom part and with the side walls substantially vertical and forming a sharp edge with the back of the hull. This arrangement is so constructed that the propeller jet will readily detach itself from the ship's bottom This results in a minimum of friction suction, and assists in raising the efficiency of the propulsion of the vessel. The transverse stability can be increased according to this invention by developing the stern of the vessel above the water line, that is, above the wedge-shaped part, to a substantially rectangular box-like form.

The combination of propelling means at the bow with towing means at the stern of the tugboat makes the tugboat travel always in a stable equilibrium. If the tugboat deviates from its course, the pulling force $F_1$ of the towed vessel and the propulsion force $F_2$ of the bow drive will always form a stabilizing torque in the opposite sense. This makes it also possible to determine the dimensions of the hull of a tugboat according to the invention exclusively on the basis of the weight of the engine and auxiliaries to be carried and the space required therefor. Lack of stability of the ship on its course, and lack of stability against capsizing, no longer enforce an increase in these dimensions. Therefore, the tugboat according to the present invention can be built much smaller and, in particular, much shorter, than a conventional tugboat having the same output of pull.

Referring now to Figures 11–17 somewhat more in detail, the arrangements of Figures 11 to 14 comprise a propeller mechanism 61 which is driven by a motor 62. The propeller may be a Voith Schneider propeller, which is a high speed cycloidal propeller, and this propeller is located in the forepart 63 of the hull 64. The mounting of the propeller is in the known manner, so that only the blades 65 thereof extend downwardly from the flat, substantially planar bottom region 66 of the hull 64.

Forward the propeller 61 the bottom region 67 of the hull is forwardly upwardly sloped from the beam section L'—M' below the forepart of the craft and below the water line W, toward the bow edge A'—B', so that the field of partial vacuum is formed directly in front of this hull region 67 and can have its full partial vacuum effect thereon. Thereby, a reduction of the water resistance thereto is obtained, as well as the desired result of drawing off water from the bow wave, whereby a substantially smaller bow wave results than if the same boat were propelled in another manner.

The reduction of the bow wave at the bow is particularly advantageous in connection with a small boat of the nature illustrated, because such boats are quite often operated in narrow waterways, particularly canals, and when constructed according to this invention, can operate at substantially greater speed than would otherwise be possible, a high bow wave being liable to damage the embankment of the canal.

The stern region 69 of the hull is developed at its lower portion to above water line W to have a wedge-shaped form, with a substantially flat bottom 70 which may also slightly ascend toward the stern, and with substantially vertical side walls 71 and 72. Above the wedge-shaped portion described, the stern is advantageously developed to have the same shape in plan as the bow portion, thus providing a boat rectangular in plan, although this is not an essential feature of the invention. The resulting box-shaped stern portion is designated by 73.

The tow hook 74 is positioned on board adjacent the stern at the port side of the boat, and this positioning is that which is required to create a torque reverse to that developed by the propeller which rotates in the direction of the arrow 75.

Inasmuch as the blades of the propeller project downwardly from the bottom of the ship's hull, there is danger that the propeller will be injured by being run aground or by striking drifting material, and to eliminate this possibility there is preferably provided a protective cage 76 which may consist of tubular rods, as indicated in the drawings.

Figure 15:
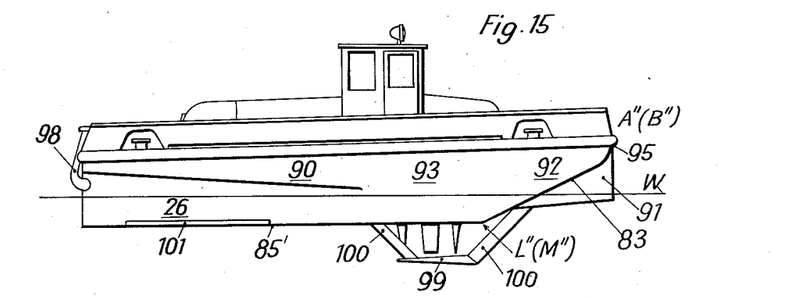
Figure 16:
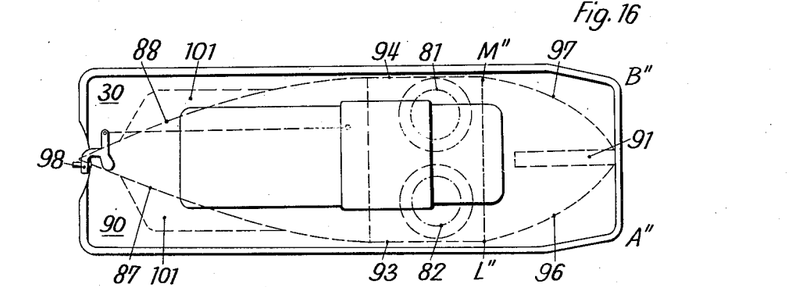
Figure 16 is a top view, of another embodiment of a tugboat constructed according to the invention, the bow drive of the tugboat comprising two cycloidal propellers.
Figure 17:
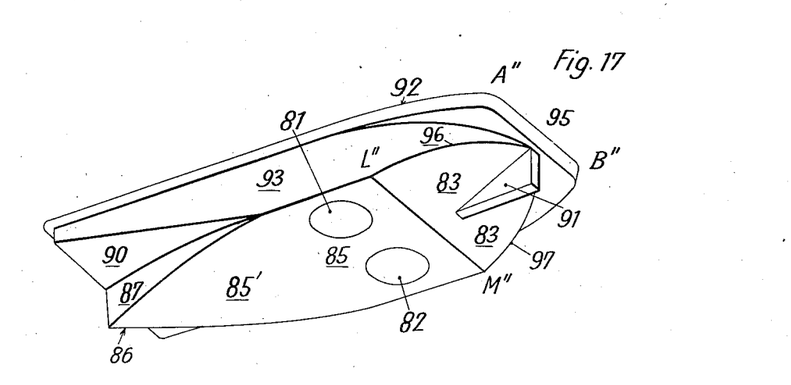
Figure 17 is a bottom view in perspective of the embodiment of the tugboat according to the invention shown in Figures 15 and 16.
Figure 18:
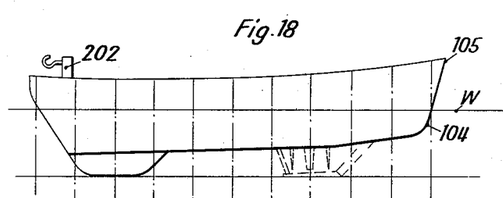
Figure 18 is a lateral view of yet another embodiment of a tugboat according to my invention, beam sections being indicated thereon.

In the modification illustrated in Figures 15 to 17, there is shown a tugboat similar to the one illustrated in Figures 11 to 14, but wherein two cycloidal propeller mechanisms 81–82 are placed side-by-side.

These propeller mechanisms are situated similarly to the propeller mechanism 61 of the embodiment of Figures 11–14, directly behind the forwardly upwardly sloped bottom region 83 of the bow of the hull and rearwardly of which the hull bottom is substantially flat as at 85. The normally submerged portion of the stern 86 of the hull is developed to a wedge-shaped form, as described in connection with the embodiment of Figures 11 and 14. The flat bottom of the stern is indicated by numeral 85' and the side walls by 87 and 88. The box-shaped enlargement of the stern above the water line W is designated by numeral 90. The tugboat is also provided with an ice ram 91.

In this embodiment the bottom of the bow portion 92 of the vessel is forwardly upwardly sloped from the beam sections L"—M" toward the bow edge A"—B", while at the same time the side walls 93 and 94 and consequently also the bow bottom 83, are curved inwardly toward the nose 95 of the vessel, the sidewalls 93 and 94 of the hull forming curved edges 96 and 97 with the thus forwardly upwardly as well as forwardly inwardly sloped bow portion 83.

The tow hook 98 in the embodiment of Figures 15 to 17 may be positioned at the stern position 90 on the center line of the craft, inasmuch as the two cycloidal propellers 81 and 82 rotate in opposite directions and the propeller torques generated thereby are, accordingly, in a state of equilibrium or balance, and impart no torque to the vessel itself.

For the purpose of protecting the propellers 81 and 82 against being damaged, they may be provided with a protective cage comprising a plate 99 therebeneath and the supporting rods 100, all of which are preferably of streamlined shape. These parts have been omitted in Fig. 17 for the sake of clarity.

In the embodiment of Figures 15 to 17, in order to provide for efficiently disengaging the propeller jet from the hull of the ship and particularly from the stern bottom portion 25, there may be provided special plates or fins 101 extending laterally therefrom. These fins 101 prevent the propeller stream from flowing up high along the walls 87 and 88; the fins 101 thus contribute to more efficient operation; these parts have also been omitted in Figure 17.

The embodiment of Figures 15 to 17 has a number of advantages over a single-propeller construction, and one of the most important is due to the fact that the blade length of the propellers can be substantially shorter than when only one propeller is used. This reduces the depth of the craft and gives added safety against the propellers being run aground.

Also, a tugboat having two propellers has much better maneuverability, principally due to the lack of torque on the vessel, and which maneuverability becomes apparent when it is attempted to bring the tugboat alongside a larger towed ship and to push the ship laterally.

Figures 18 to 22 illustrate yet a further embodiment of the bow portion of a tugboat according to the invention, the shape of which bow portion is derived from that illustrated schematically in Figure 9. In this embodiment the bow drive comprises the two Schneider-Voith propellers 81 and 82, however, located in somewhat outwardly upwardly inclined position in the forwardly upwardly sloped bottom portion 102 of the tugboat.

The bottom of the bow portion 102 between the propellers 81, 82, and a region indicated by 104 near where the bow of the hull emerges from the water line W, shows a gradual transition in shape from the flat bottom area around the propellers 81, 82 to the preferably wedge-shaped bow line 52, which extends partly below and partly above the water line W and terminates at its upper end in the prow 105.

Instead of the fin 103, the propelling means in the hull bottom in Figure 22 are protected by a cage 20 and airfoil plate 21 similar to those shown in Figure 6 and to parts 99 and 100 shown in Figure 15.

Figure 21 illustrates the beam sections beginning with the bow line 52 and ending at the central portion of the hull, where beam sections 59 and 60 are of identical shape. The same beam sections are indicated by dash-dotted lines in the lateral and bottom view of the forward hull portion of the tugboat shown in Figures 18 and 19, respectively.

Of course, the tugboat partially illustrated in Figures 18–22 bears in its rear third, preferably on deck, fastening means for the flexible lengthy connecting lines or hawsers of a towed vessel, such as the towing hooks shown in Figures 3 to 7 and 11 to 17.

Figure 22A:
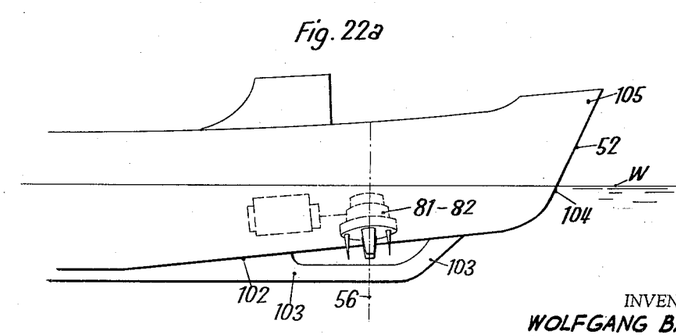
Figure 22a is a lateral view of another embodiment of a tugboat according to my invention.

Figure 22a illustrates the forward hull portion of a tug boat according to the invention in which the propellers 81 and 82, arranged in the plane of the frame 56, do not protrude beyond the lowest point of the hull which is located between frames 59 and 60. Owing to the smoothness of the hull bottom between frames 56 and 59 aft the stream of water produced by the propellers 81 and 82 may tangentially flow beneath this bottom without creating unfavourable resistance.

A fin 103 located on the center line 102 between the two propellers serves as protection for the propeller and steering units against damages caused by ground contact. At least in the vicinity of the propellers 81 and 82 the bottom of the vessel is practically flat and even plane.

Tugboats according to my invention of the different kinds described demonstate the value of their various above-described advantages in particular when used in a mechanical system as illustrated in Figure 23.

In other mechanical systems occurring in the art of towing, these advantages, although always of importance, are not as strikingly obvious as in the system of Figure 23. These tugboats are often used for pushing a towed vessel or backing or laterally displacing the same by being tied board-to-board with the towed vessel by short lines. It has even been proposed to link a tugboat and one or several towed vessels together by short, and preferably rigid, connecting links, as in the Patent 1,014,313 to William R. Macklind, or to rigidly, unmovably connect a head and a tail 'boat," both of which boats carry propelling and steering means, to a central "float" portion so as to form a unitary, substantially rigid system, as in the French Patent 876,425 to Reichswerke A. G. These systems may be used on rivers and canals, but never on the high seas or on the roads in front of a seaport.

The tugboats according to my invention, although they may be connected, during certain towing maneuvers, to the towed vessel directly by short lines, are destined and reveal their above-described advantages fully in a mechanical system which comprises, as is shown in Figure 23: (a) the tugboat 200 with propelling and steering means 201 provided symmetrically on both sides of the bow in the beam section 56, and a towhook 202 in the rear third of the boat on the deck thereof; (b) a towed vessel such as, for instance, the steamship 205, which is connected to the tugboat 200 by means of a long, flexible towline, such as a cable or hawser 204.

In maneuvering a system of this kind a great number of problems arise which will never be encountered by the rigidly interconnected known systems mentioned above.

Figures 24A, 24B:
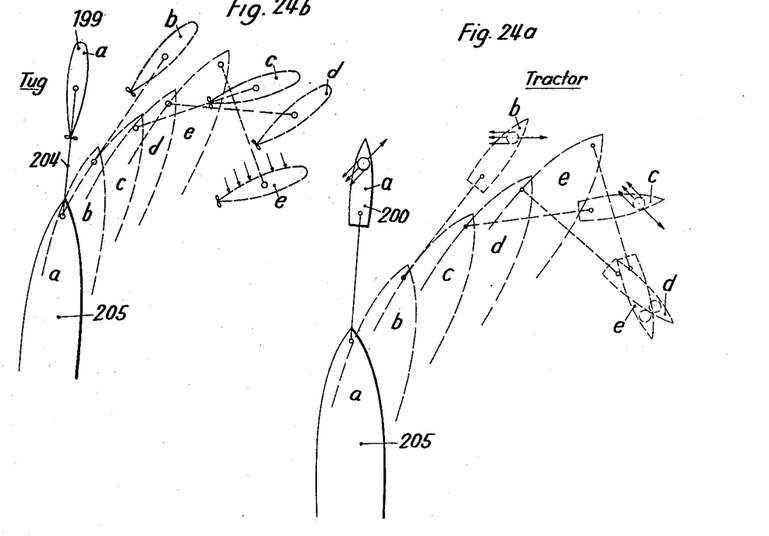
Figure 24a illustrates schematically, in top view, a towing maneuver being carried out in the system shown in Figure 23 with a tugboat according to the invention, and shows the forces involved.
Figure 24b illustrates the same towing maneuver as in Figure 24a, but carried out with a conventional tugboat in the system illustrated in Figure 2.
Figures 25, 25B:
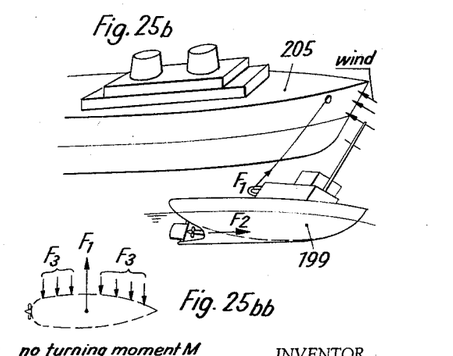
Figure 25b is a perspective illustration of the position e shown in the maneuver illustrated in Figure 24b.
Figures 25, 25A:
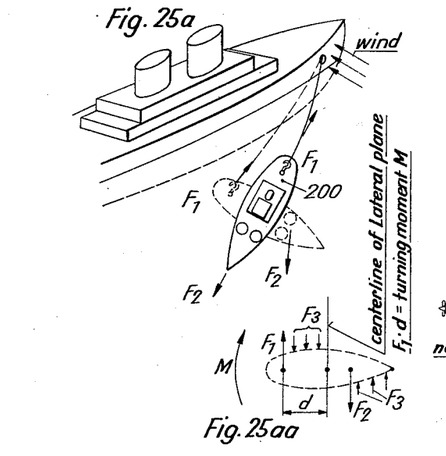
Figure 26A:
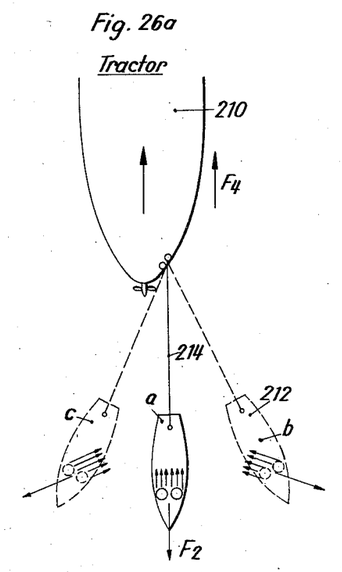
Figure 26a illustrates schematically, in top view, another maneuver carried out in another system comprising a tugboat according to the invention.
Figure 26B:
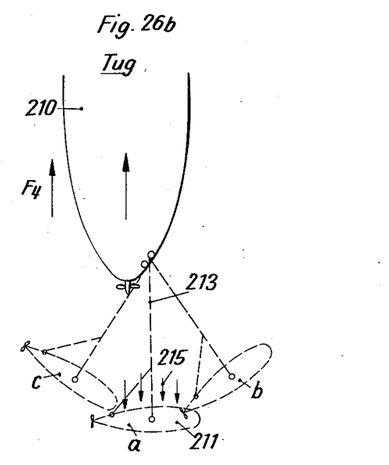
Figure 26b illustrates, schematically and in top view, the same maneuver as in Figure 26a but carried out in a system comprising a conventional tugboat.

Only two typical ones of these problems shall be explained on the basis of Figures 24a, 25a and 26a, illustrating towing systems comprising a tugboat according to my invention and by comparing them with similar systems comprising a conventional tugboat as illustrated in Figures 24b, 25b and 26b.

It must be borne in mind that three principal forces act on a tugboat in these maneuvers: (1) the force of propulsion $F_2$ exercised by the propelling means either astern the vessel as in the conventional tugboats, or at the bow portion as in the tugboats according to my invention; (2) the reactive force $F_1$ exercised by the towed vessel via the connecting line, which attacks the boat at whatever point P the connecting line is fastened; and (3) the forces of water $F_3$.

A tugboat at which, as illustrated in Figure 1, the reaction force of the towline is acting at the after end, that is in the vicinity of the screw and the rudder, is unable to maneuver because the forces of the towline prevent the stern from following the maneuvers. It has been proved that for a harbour tug which has to execute sudden maneuvers in confined waters a fastening of the towline at the afore-mentioned location, i.e. in the vicinity of screw and rudder, is impossible. The towing hook and with it the point of application of the towline pull had to be moved to the approximate center of the tug length as this is shown in Figure 2. A tugboat as shown in this illustration is now independent of the towline forces and can be well maneuvered. However, other difficulties arise, namely the danger of capsizing and course instability, the latter particularly at low towing speed. In arranging the towing hook at the extreme aft, towline forces acting transversally to the longitudinal of the tugboat cause the tugboat to turn around its lateral center of gravity, i.e., the center of gravity of the lateral surface of projection, on a vertical longitudinal plane, of that portion of the tug which is below water, and to align itself automatically to the longitudinal direction of the towline. However, this is not the case with the towing hook arranged as per Figure 2, because the towline force $F_1$ has no or only a slight lever arm acting on the lateral center of gravity L.S. around which the tugboat should turn. The tugboat would then be pulled athwartships through the water on account of the transverse towline and would capsize, if in the end the heeling moment initiated by the towline would exceed the lateral stability of the tugboat. The towing hook arranged about midships has the advantage to guarantee full maneuverability to the tug without excluding the disadvantages of capsizing and instability of course.

In Figure 23 a tugboat according to my invention is shown which retains also its full maneuverability, but excludes additionally the danger of capsizing and attains a maximum of course stability. The towing hook was arranged at the stern as shown in Figure 1. In order to retain the maneuverability and to increase the course stability the propulsive unit and the steering mechanism were located as far away from this point as possible, i.e. to the bow.

The advantages of an arrangement as per my invention are illustrated by an example. A customary tugboat with towing hook arranged midships is supposed to tow a seagoing vessel into the port. It is, furthermore, supposed that the machine of the seagoing vessel is still working. The tugboat has now the task to turn the vessel in the basin, i.e. to execute the turning movement, if possible, on the spot. The tugboat starts this maneuver by falling to one side and turning slowly on opposite course. Since the seagoing vessel retains the direction of travel the towing hawser is set in an oblique angle to the longitudinal axis of the tugboat. If the seagoing vessel does not stop immediately and does not respond instantly to the turning maneuver but is pushed on by its own force due to inertia (see positions b, c, d of Figure 24b) or is quickly driven off by winds, the force in the towing hawser grows rapidly and pulls the tug athwartships through the water (position e of Figure 24b). On account of the lateral influx the water pressure at the underwater lateral plane of the tug is building up heavily and there results a large heeling moment consisting of the sum of these water pressures plus the transverse pull of the towline connected to the tugboat above its deck. If this moment exceeds the lateral stability of the tugboat, it capsizes.

This situation e of Figure 24b is illustrated as a perspective seen from above in Figure 25b. In order to avoid capsizing, the conventional tugboat would have the only possibility to slip the line. However, this would leave the vessel under tow without control by the tugboat and there would be danger of its running against the dock.

A tugboat according to the invention and as illustrated in Figure 23 never encounters the danger of capsizing, because the towline force acts on the stern and produces a moment M, located in the plane of buoyancy, which pulls the tugboat automatically into the longitudinal direction of the towline by which the heeling moment is reduced immediately. The tugboat 200 is turned with its stern into the longitudinal direction of the towline, once the forces become too large. These conditions are shown in Figures 24a and 25a.

Another advantage of the tugboat according to the invention and if compared to the customary tugboats is illustrated by the description of another maneuver, which is shown in Figures 26a and 26b. The vessel 210 moves under own power and is braked by a conventional tugboat 211 as per Figure 26b or by a tugboat 212 according to subject invention as per Figure 26a. In both cases the tugboats 211 or 212 are connected to the vessel to be braked by long flexible lines 213 or 214 respectively. According to the general method the customary tugboat 211 is arranged at a right angle to the direction of travel behind the stern of the vessel 210 to be braked in the manner as shown. This tugboat does not brake by machine power, because this is impossible on account of the unstable equilibrium between the two major forces $F_1$ and $F_2$ acting on the tugboat hull. For this reason it brakes by the water resistance 215 which is produced by pulling its underwater lateral plane crosswise through the water. Correspondingly, the faster it is pulled through the water the greater its braking action, and the lower this speed is the smaller the braking action. It is particularly troublesome that this braking force by the lateral resistance is practically nil if the seagoing vessel is gliding slowly through the water. In order to bring the seagoing vessel to a complete stop the braking tugboat must change its position to the vessel under tow and must bring its longitudinal axis in line with the longitudinal axis of the seagoing vessel in order to stop the last speed of the vessel by machine power. However, this maneuver requires time, and particularly during these critical moments there should be no loss of time, if possible. It is especially disagreeable that the tugboat while being pulled crosswise through the water is subjected continuously to the danger of capsizing which becomes acute if, for instance, the seagoing vessel increases by own machine power its forward speed suddenly. The danger of capsizing is acute also if the sudden stream of water increases the water pressure against the lateral plane of the tugboat. In order to avoid the danger of capsizing there is again the only possibility to slip the line 213 immediately. This leaves, however, the seagoing vessel 210 without control.

These difficulties never occur with tugboat 212, because its longitudinal axis is in perfect alignment with the longitudinal axis of the seagoing vessel to be braked and it is able to enlarge or reduce the braking power by varying the machine speed at any time and may additionally change the direction of the thrust $F_2$ at will in order to steer the vessel under tow.

Cycloidal propellers, especially Voith-Schneider propellers are described, for instance, in the Patent 1,681,500, and an advantageous mode of operating them as a steering as well as a propelling means is described in Patent 1,870,674 assigned to the same assignee as the present application.

It will be understood that this invention is susceptible to modification in order to adapt it to different usages and conditions, and, accordingly, it is desired to comprehend such modifications within this invention as may fall within the scope of the appended claims.

What is claimed is:

1. In a mechanism for effectively and safely towing aquatic vessels, the combination of a towing vessel, a tow cable attachment mounted at the stern of the towing vessel and propelling means consisting exclusively of tractor propeller means mounted adjacent to the bow of the towing vessel so that when a towed vessel is connected to said cable attachment, said towing vessel will be free to turn and maneuver without danger of capsizing due to forces acting through said tow cable attachment.

2. A tugboat-towed vessel arrangement for effectively and safely towing aquatic vessels involving a propelling moving force applied at a tugboat, a force exerted by a towed vessel and pulling the tugboat in a direction different from that of said moving force, and forces exerted by the water on the lateral plane of the tugboat counteracting effects of said force exerted by the towed vessel which may tend to set off course or capsize the tugboat during turning or maneuvering, comprising the combination of: a tugboat having a hull formed with a stern and a bow, said hull being only of such dimensions as to house therein and carry with sufficient buoyancy the operating elements of said tugboat, tow cable attachment means at said stern of said tugboat, a towed vessel cable-connected to said attachment means at said stern of said tugboat, and propelling means located adjacent to said bow of said tugboat so as to permit turning and maneuvering of said tugboat continuously on a stable course and free from the aforesaid danger of capsizing, irrespective of the angle at which said force exerted by the towed vessel pulls at said stern of said tugboat relative to said moving force.

3. A tugboat-towed vessel arrangement for effectively and safely towing aquatic vessels involving a propelling moving force applied at a tugboat, a force exerted by a towed vessel and pulling the tubgoat in a direction different from that of said moving force, and forces exerted by the water on the lateral plane of the tugboat counteracting effects of said force exerted by the towed vessel which may tend to set off course or capsize the tugboat during turning or maneuvering, comprising the combination of: a tugboat having a stern and a bow, hook means at said stern of said tugboat, a towed vessel, elongated, flexible cable means connecting said towed vessel to said hook means of said tugboat, and propelling means located adjacent said bow of said tugboat so as to permit turning and maneuvering of said tugboat continuously on a stable course and free from the aforesaid danger of capsizing, irrespective of the angle at which said force exerted by said towed vessel pulls at said stern of said tugboat relative to said moving force.

4. A tugboat adapted for towing vessels connected by long, flexible cable means thereto, and having a hull with a bow end and a stern end, a bow drive comprising propelling means and steering means being the exclusive ones for said tugboat and being disposed below the water line underneath the bow end of the tugboat, said underwater bow end immediately in front of said propelling and steering means forming at least one oblique hull surface in forward direction at an angle to the central longitudinal axis of the tugboat, whereby said propelling means cause an acceleration field, to be formed in the water directly in front of said bow end and due to the water current toward said propelling and steering means, which field imparts a forward acceleration to the tugboat by acting on said oblique hull surface of said underwater bow end in the range thereof forward of said propelling and steering means, a substantial bottom portion of the hull rearward of said propelling and steering means being of smooth shape and the entire rear portion of the hull being free from propelling and steering means so that the water jet produced by said bow drive is undisturbed due to the fact of the boat being exclusively bow driven; and a towing hook adapted for connecting the tow line from a towed vessel thereto, said tow hook being carried by the tugboat in the rear third of the bow-to-stern longitudinal extension of the tugboat toward the stern end thereof, so as to obtain the maximum stability of course and the maximum stability against capsizing under the effect of the forces of propulsion acting on said bow end and the pull exerted on said hook.

5. A tugboat for towing vessels connected by a hawser line thereto having a hull with a bow end and a stern end, a bow drive comprising propelling means and steering means being the exclusive ones for said tugboat, and being disposed below the waterline underneath the bow end of the tugboat, said underwater bow end immediately in front of said propelling and steering means being inclined at an angle upwardly in forward direction, whereby said propelling means cause an acceleration field, to be formed in the water directly in front of said bow end and due to the water current toward said propelling and steering means, which field imparts a forward acceleration to the tugboat by acting on the upwardly and forwardly inclined underwater bow end in the range thereof forward of said propelling and steering means, substantially the entire bottom portion of the hull rearward of said propelling and steering means being of smooth shape and free from propelling and steering means so that the water jet produced by said bow drive takes the form of a tangent to the hull bottom over a relatively wide area undisturbed due to the fact of the boat being exclusively bow driven, and a towing hook adapted for connecting the hawser line from a tow thereto and carried by the tugboat in the rear third of the bow-to-stern longitudinal extension of the tugboat toward the stern end thereof so as to obtain the maximum stability of course and the maximum stability against capsizing under the effect of the forces of propulsion acting on said bow end and the pull exerted on said hook.

6. A tugboat for towing vessels connected by a hawser line thereto having a hull with a bow end and a stern end, a bow drive comprising propelling means and steering means being the exclusive propelling and steering means for said tugboat, and being disposed below the waterline underneath the bow end of the tugboat, said propelling and steering means extending at least with an effective part thereof downwardly beyond the lowest level of the bottom of the hull, said underwater bow end immediately in front of said propelling and steering means being inclined at an angle upwardly in forward direction, whereby said propelling means cause an acceleration field, to be formed in the water directly in front of said bow end and due to the water current toward said propelling and steering means, which field imparts a forward acceleration to the tugboat by acting on the upwardly and forwardly inclined underwater bow end in the range thereof forward of said propelling and steering means, substantially the entire bottom portion of the hull rearward of said propelling and steering means being of smooth shape and free from propelling and steering means so that the water jet produced by said bow drive takes the form of a tangent to the hull bottom over a relatively wide area undisturbed due to the fact of the boat being exclusively bow driven, and a towing hook adapted for connecting the hawser line from a tow thereto and carried by the tugboat in the rear third of the bow-to-stern longitudinal extension of the tugboat toward the stern end thereof so as to obtain the maximum stability of course and the maximum stability against capsizing under the effect of the forces of propulsion acting on said bow end and the pull exerted on said hook.

7. A tugboat for towing vessels connected by a hawser line thereto, having a hull with a bow end and a stern end, a bow drive comprising at least one cycloidal propeller being the exclusive propelling means and steering means for said tugboat and being disposed below the waterline underneath the bow end of the tugboat, said underwater bow end immediately in front of said propelling and steering means being inclined at an angle upwardly in forward direction, whereby said propelling means cause an acceleration field, to be formed in the water directly in front of said bow end and due to the water current toward said propelling and steering means, which field imparts a forward acceleration to the tugboat by acting on the upwardly and forwardly inclined underwater bow end, said hull in the range thereof rearwardly of said propelling and steering means being of smooth shape and free from any additional propelling and steering means so that the water jet produced by said bow drive takes form of a tangent to the hull bottom over a relatively wide area undisturbed due to the fact of the boat being exclusively bow driven, and a towing hook adapted for connecting the hawser line from a tow thereto carried by the tugboat in the rear third of the bow-to-stern longitudinal extension of the tugboat toward the stern end thereof so as to obtain the maximum stability of course and the maximum stability against capsizing under the effect of the forces of propulsion acting on said bow end and the pull exerted on said hook.

8. A tugboat having a hull with a bow end and a stern end, a bow drive comprising at least one cycloidal propeller being the exclusive propelling means and steering means for said tugboat and being disposed below the waterline underneath the bow end of the tugboat, said propelling and steering means extending at least with an effective part thereof downwardly beyond the lowest level of the bottom of the hull, said underwater bow end immediately in front of said propelling and steering means being inclined at an angle upwardly in forward direction, whereby said propelling means cause an acceleration field, to be formed in the water directly in front of said bow end and due to the water current toward said propelling and steering means, which field imparts a forward acceleration to the tugboat by acting on the upwardly and forwardly inclined underwater bow end in the range thereof forward of said propelling and steering means, substantially the entire bottom portion of the hull rearward of said propelling and steering means being of smooth shape and free from propelling and steering means so that the water jet produced by said bow drive takes the form of a tangent to the hull bottom over a relatively wide area undisturbed due to the fact of the boat being exclusively bow driven, and a towing hook carried by the tugboat in the rear third of the bow-to-stern longitudinal extension of the tugboat toward the stern end thereof so as to obtain the maximum stability of course and the maximum stability against capsizing under the effect of the forces of propulsion acting on said bow end and the pull exerted on said hook.

9. A tugboat according to claim 6, in which the propelling means is a screw propeller, and means are provided for supporting the propeller for rotation about a vertical axis whereby the propelling means also serves as said steering means.

10. A tugboat according to claim 6, in which the propelling means is a single cycloidal propeller and wherein said towing hook is adjusted laterally of the center line of the craft so that the pull of the hawser line thereon exerts a torque on the craft opposite to the torque exerted thereon by the driving of said propeller.

References Cited in the file of this patent

FOREIGN PATENTS 876,425    France _________________ Aug. 3, 1942